Figure 1:
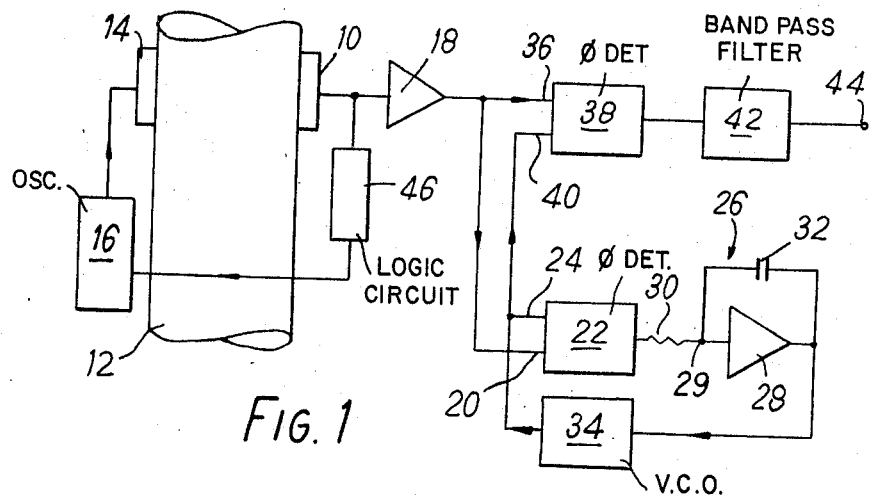

United States Patent [19]
Johnson

[11] 3,860,867
[45] Jan. 14, 1975

[54] CIRCUITS FOR DETECTING RAPID FLUCTUATIONS IN THE PHASE OF AN A.C. SIGNAL

[75] Inventor: Peter Alan Johnson, Caddington, England

[73] Assignee: George Kent Limited, Bedfordshire, England

[22] Filed: July 19, 1973

[21] Appl. No.: 381,680

[30] Foreign Application Priority Data
July 21, 1972 Great Britain.................. 34237/72

[52] U.S. Cl.............................. 324/83 R, 73/194 E
[51] Int. Cl............................................. G01r 25/00
[58] Field of Search.................. 324/83 R, 83 A, 82; 73/194 E

[56] References Cited
UNITED STATES PATENTS
3,469,190  9/1969  Rheinfelder..................... 324/83 A
3,718,856  2/1973  Hendriks.............................. 324/82

Primary Examiner—Stanley T. Krawczewicz
Attorney, Agent, or Firm—Browdy and Neimark

[57] ABSTRACT

A circuit for detecting rapid fluctuations in the phase of an A.C. signal, comprising a phase detector adapted to receive the A.C. signal at one of its input terminals and at the other of its input terminals an A.C. signal generated by a controlled oscillator and to provide an output signal dependent on the phase difference between the two signals applied to its input terminals, filter means through which the output of the phase detector is supplied to the controlled oscillator in such a manner that the output of the oscillator is held stably by negative feedback at a frequency equal to the means frequency of the A.C. signal, the filter means preventing rapid changes in the output of the phase detector from being applied to the controlled oscillator, and means for comparing the phase of the A.C. signal with that of the oscillator output thereby to provide an output dependent on the rapid fluctuations on phase of the A.C. signal.

7 Claims, 3 Drawing Figures

PATENTED JAN 14 1975　　3,860,867

CIRCUITS FOR DETECTING RAPID FLUCTUATIONS IN THE PHASE OF AN A.C. SIGNAL

This invention relates to circuits for detecting rapid fluctuations in the phase of a A.C. signal.

The invention is particularly, though not exclusively, concerned with circuits which can be used to detect rapid fluctuations in the phase of A.C. signals provided by receiver transducers of cross-correlation flowmeters.

In cross-correlation flowmeters for measuring the flow of a fluid, such as are described in co-pending U.S. Pat. application Ser. No. 159,864 filed July 6, 1971, now U.S. Pat. No. 3,762,221, ultrasonic waves transmitted by a transducer energized by a constant frequency oscillator and travelling transverse to the direction of fluid flow are received by a receiver transducer which provides an electrical output signal. Disturbances in the fluid flowing past the transducers imparts a noise modulation to the transmitted ultrasonic waves and so to the output signal of the receiver transducer. A similar pair of transducers is positioned downstream of the first pair of transducers, the receiver transducer of the second pair similarly providing an output signal carrying a noise modulation due to disturbances in the fluid flow. By cross-correlating the noise signals of the receiver transducer of each pair a measure can be obtained of the time taken for disturbances to flow between the two pairs of transducers and hence of the speed of the fluid flow.

A convenient way of utilising the noise modulation due to disturbances in the fluid flow, e.g. as described in connection with one embodiment in the above-mentioned co-pending applications, is to apply the output of the receiver transducer together with an output from the oscillator driving the transmitter transducer to a phase detector so as to detect the rapid changes in the phase shift of the transmitted signal between the transmitter transducer and receiver transducer, these changes being due to turbulence in the fluid flow which gives fluctuating components of flow velocity in the fluid in the direction transverse to the overall fluid flow. A problem arises with such a system because of slow changes in the mean phase shift between the transmitted and received signals (i.e., the phase shift which would appear in the absence of any noise modulation due to flow disturbances), due to physical changes in the apparatus such as a change in pressure or temperature of the fluid which can change the velocity of transmission of ultrasonic waves in the fluid and which, when the fluid flow is through a pipe, can also cause small changes in the diameter of the pipe, thus changing the path length between the transmitter and receiver transducers. Since the sensitivity of most phase detectors varies with the phase difference between signals applied to the detector, the characteristic of the phase detector output against phase difference typically following a cosine law, such slow changes in the mean phase shift can cause the strength of the noise signal obtained from the receiver transducer to vary considerably during operation of the apparatus, and can also cause the polarity of the noise signal to change.

According to this invention there is provided a circuit for detecting rapid fluctuations in the phase of an A.C. signal, comprising a phase detector adapted to receive the A.C. signal at one of its input terminals and at the other of its input terminals an A.C. signal generated by a controlled oscillator and to provide an output signal dependent on the phase difference between the two signals applied to its input terminals, filter means through which the output of the phase detector is supplied to the controlled oscillator in such a manner that the output of the oscillator is held stably by negative feedback at a frequency equal to the mean frequency of the A.C. signal, the filter means preventing rapid changes in the output of the phase detector from being applied to the controlled oscillator, and means for comparing the phase of the A.C. signal with that of the oscillator output thereby to provide an output dependent on the rapid fluctuations in phase of the A.C. signal.

The means for comparing the phase of the A.C. signal with that of the oscillator output may comprise a further phase detector, the A.C. signal and the oscillator output each being supplied in parallel to the appropriate input terminals of the two phase detectors.

Alternatively, the means for comparing the phase of the A.C. signal with that of the oscillator output may comprise the same phase detector, the output of the circuit being taken from the output of the phase detector in parallel with the supply to the controlled oscillator.

Figure 2:
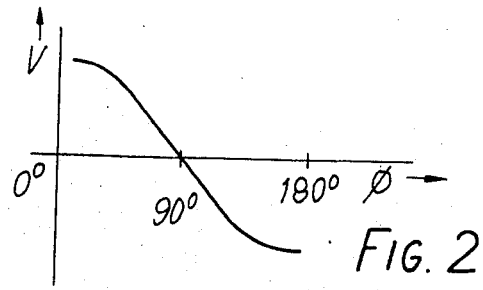
Figure 3:
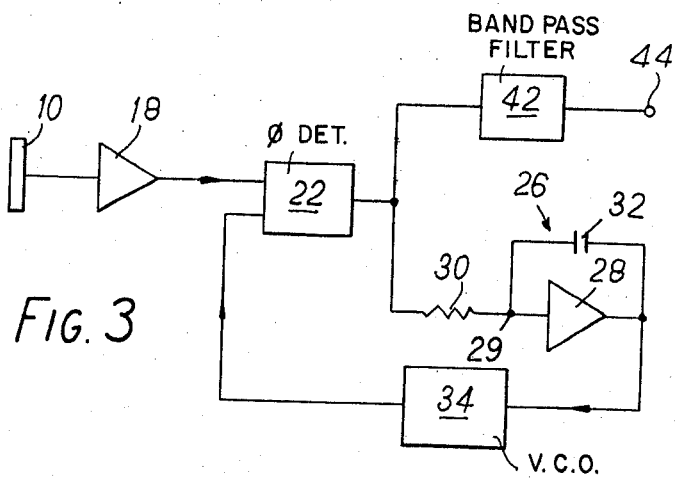

The invention will now be described, by way of example, with reference to the accompanying drawings, in which:

FIG. 1 is a block diagram of one channel of a cross-correlation flowmeter employing a circuit in accordance with the present invention, FIG. 2 shows the voltage-phase characteristic of a phase detector used in the circuit of FIG. 1, and FIG. 3 is a block diagram of an alternative embodiment of the invention.

Referring to FIG. 1, there is provided a circuit for detecting rapid phase changes in the output signal from a transducer 10 mounted on the wall of a pipe 12. The transducer 10 detects ultrasonic waves transmitted by a transducer 14 energised by an oscillator 16, which provides a constant frequency output which may be of the order of 1 MHz. The sound waves transmitted through fluid flowing through the pipe suffer changes in phase owing to turbulent flow in the pipe, so that the output of the receiver transducer 10 consists of an A.C. signal of constant frequency undergoing rapid fluctuations in phase.

The output of transducer 10 is amplified by a high gain limiting amplifier 18, and the amplified signal is supplied to one input 20 of a phase detector 22. The phase detector is operable to provide an output voltage dependent on the difference in phase between two signals applied to its input terminals 20 and 24, the output voltage varying with the phase difference in a manner which depends on the nature of the signals applied to the input terminals. For example, if the two input signals are both sinusoidal, and the phase detector is of the type which multiplies together the input signals, the output voltage will vary with the phase difference according to a cosine law, with the output zero when the phase difference between the input signals is 90°, as shown in FIG. 2, which is a graph of output voltage V against phase difference $\phi$. In most cases, the characteristic will depart more or less from such a cosine law and may for example approach a triangular function. The phase detector may be any suitable construction, for example a solid state phase detector of well known kind which operates by multiplying together the input signals.

The output of the phase detector is fed to an integrator 26 consisting of a high gain amplifier 28, a resistor 30 through which the phase detector output is supplied to the input 29 of the amplifier 28, and a capacitor 32 connected in the feed-back loop between the output and input of the amplifier. The integrator 26 has a long time constant, of the order of seconds, so that the output of the integrator corresponds to the mean value, over short periods of time, of its input, rapid changes in the input being blocked by the integrator. The integrator thus acts as a low-pass filter, having a cut-off frequency of the order of 0.1 Hz.

The output of the integrator 32 is supplied to a voltage controlled oscillator 34 which provides an output, which may for example be a square wave output, of frequency dependent on the input voltage. The output of the voltage controlled oscillator is supplied to the input terminal 24 of the phase detector 22.

The phase detector 22 thus provides an output voltage dependent on the phase difference between the output of the controlled oscillator and the output of amplifier 18. If the mean frequency of the output of amplifier 18 is the same as the output frequency of the controlled oscillator 34, the output of the phase detector 22 consists of a constant voltage component corresponding to the phase difference between the oscillator output frequency and the mean frequency of the amplifier output, having superimposed on it a fluctuating component corresponding to the rapid fluctuations in the phase difference between the two input signals. The rapid changes in the phase detector output are blocked by the integrator 26, so that the output of the integrator is a constant voltage corresponding to the constant voltage component of the phase detector output. In the equilibrium condition, the phase difference between the oscillator output frequency and the mean frequency of the output of amplifier 18 will be such that the output of the integrator will maintain the oscillator output at the correct frequency. If the mean frequency of the output of amplifier 18 changes relatively slowly, the phase difference between that output and the controlled oscillator frequency will begin to change, with the result that the mean voltage at the output of the phase detector will change correspondingly. If the mean frequency of the output of amplifier 18 changes slowly, the change in the mean output voltage of the phase detector will be followed by the output of the integrator 26, which will effect a change in the output frequency of the voltage controlled oscillator 34. The circuit is arranged so that an increase in the mean frequency applied to input 20 of the phase detector 22 causes the voltage output to change in such a direction as to increase the output frequency of the controlled oscillator 34. A negative feedback is therefore provided through the integrator and voltage controlled oscillator which causes the output frequency of the oscillator to follow the mean frequency of the signal supplied to phase detector 22, the phase detector 22, integrator 26 and controlled oscillator 34 forming a phase locked loop. The oscillator output is thus held stably at a frequency equal to the mean frequency of the output of amplifier 18, which, of course, is equal to the frequency of the oscillator 16 energising the transmitting transducer 14.

The characteristics of the components of the loop are so chosen that the frequency of the controlled oscillator reproduces the mean frequency of the signal generated by receiving transducer 14, together with frequency modulations below about 1 Hz, so that the oscillator output will follow only slow changes in that mean frequency.

The output of amplifier 18 is also supplied to the input terminal 36 of a second phase detector 38 which is similar in construction and operation to the phase detector 22. The other input terminal 40 of phase detector 38 receives the output of the voltage controlled oscillator 34. The phase detector 38, in the same way as phase detector 22, provides an output voltage consisting of a constant or slowly varying component corresponding to the phase difference between the frequency of the output of voltage controlled oscillator 34 and the mean frequency of the output of amplifier 18, and a varying component corresponding to the rapid fluctuations in the phase difference between the two. The output of the phase detector 38 is supplied through a band pass filter 42 to the output terminal, the filter 42 having a pass band of, say, 1 Hz to 1 KHz selected so that the noise signal appearing at the terminal has component frequencies in a range suitable for further processing in cross-correlation circuitry connected to terminal 44. Thus, the signal appearing at output terminal 44 is a noise signal corresponding to fluctuations in phase of the ultrasonic waves transmitted through fluid flowing in the pipe 12.

The characteristics of the phase detector 22 and 38 and the voltage controlled oscillator 34 are chosen so that the phase difference between the mean frequency of the output of amplifier 18 and the output of the controlled oscillator is approximately 90°, so that, as will be apparent from FIG. 2, the phase detectors operate on the nearly linear part of their characteristic. The sensitivity of the circuit to fluctuations in the phase of the transmitted ultrasonic waves is therefore at its maximum value. It will be appreciated that slow changes in the phase shift between the signal driving transmitting transducer 14 and the signal generated by receiving transducer 10, owing to physical changes in the fluid or the pipe 12, will not affect the sensitivity of the circuit, since the operation of the phase locked loop consisting of phase detector 22, integrator 26 and controlled oscillator 34, will cause the phase of the oscillator output to follow slow changes in the phase of the output of amplifier 18.

In certain circumstances, it may happen that at particular frequencies of the oscillator 16 driving transmitting transducer 14, standing waves are set up in the pipe, with the result that the output of receiving transducer 10 falls to a low value. To avoid this situation, logic circuitry 46 may be provided to detect the fall in the output of transducer 10 and to effect a change in the frequency of oscillator 16, until the output of transducer 10 returns to its normal value. The output of the voltage controlled oscillator 34 will then automatically follow the change in the frequency of oscillator 16, as described above.

A second channel (not shown) of the cross-correlation flowmeter, consisting of a circuit identical with that of the first channel, is provided with its transmitting and receiving transducers fixed to the pipe at a location spaced from transducers 14 and 10 in the direction of fluid flow, and the noise signals from the output terminal 44 and the corresponding output terminal of the second channel are supplied to suitable cross-correlation circuitry, e.g. as described in co-pending application Ser. No. 159,864.

In the embodiment of FIG. 3, only one phase detector 22 is employed as part of the phase locked loop and also to provide the noise signal output to output terminal 44. In this case it is necessary that the output of the phase detector should have effectively zero impedance, to prevent interference between the phase locked loop and the circuitry connected to output terminal 44.

It will be appreciated that instead of using a phase detector providing a voltage output, and a voltage controlled oscillator, these components could be arranged to operate with varying current signals, so that the noise output signal at terminal 44 is provided as a varying current signal.

I claim:

1. A circuit for detecting rapid fluctuations in the phase of an A.C. signal comprising:
    an input terminal to which the A.C. signal is applied and an output terminal,
    a first phase detector having first and second input terminals and an output terminal;
    means for applying the A.C. signal, the phase fluctuations of which are to be detected, to said first input terminal of said first phase detector;
    a controlled oscillator having a control input terminal and an output terminal, said controlled oscillator generating a signal on said output terminal responsive to a signal on said control terminal;
    means for connecting said signal on said output terminal of said controlled oscillator to said second input terminal of said first phase detector;
    said first phase detector providing an output signal on said output terminal of said first phase detector dependent upon the difference in phase between the A.C. signal applied to said first input terminal of said first phase detector and said signal applied to said second input terminal of said first phase detector;
    low pass filter means with an input terminal, electrically connected to said output terminal of said first phase detector, and an output terminal electrically connected to said control input terminal of said controlled oscillator, for passing said first phase detector output signal to said control terminal of said controlled oscillator, such that, said controlled oscillator is held by negative feedback at a frequency equal to the mean frequency of the A.C. signal;
    said low pass filter means being operative to prevent changes in said output of said first phase detector occurring at frequencies above a predetermined value from being passed from said output terminal of said first phase detector to said control terminal of said controlled oscillator;
    means for comparing the phase of the A.C. signal with said signal generated by said controlled oscillator to thereby generate a signal dependent solely on rapid fluctuations in phase of the A.C. signal.

2. Apparatus for measuring the flow of a fluid using the circuit in accordance with claim 1, comprising at least one emitter transducer means to generate in the fluid ultrasonic waves of substantially constant frequency, a receiver transducer means spaced from the emitter transducer in the direction transverse to the direaction of fluid flow to receive ultrasonic waves transmitted through the fluid and to generate a corresponding electrical output signal consisting of an A.C. signal phase modulated owing to disturbances in the flowing fluid, and said circuit connected to said receiver transducer so that the output signal of said receiver transducer is supplied to the said first input terminal of said phase detector of said circuit.

3. A circuit as claimed in claim 1, in which said means for comparing the phase of the A.C. signal with that of said signal generated by said controlled oscillator comprises a second phase detector having first and second input terminals and an output terminal, the A.C. signal and said signal generated by said controlled oscillator each being supplied in parallel to said first and second input terminals of said first and second phase detectors.

4. A circuit as claimed in claim 1, in which said means for comparing the phase of the A.C. signal with that of said signal generated by said controlled oscillator comprises said first phase detector, the output of the circuit being taken from said output terminal of said first phase detector in parallel with said input terminal of said low pass filter, and the output impedance of said first phase detector being such that there is no interference between said signal at said input terminal of said low pass filter and the said output of the circuit.

5. A circuit as claimed in claim 1, in which said low pass filter means comprises an integrator having a long time constant compared with the periods of the fluctuations in the phase of the A.C. signal.

6. A circuit as claimed in claim 1, and adapted to detect phase fluctuations at frequencies of the order of 1Hz – 1KHz, in which said low pass filter means has a cut-off frequency of the order of 0.1 Hz.

7. A circuit as claimed in claim 1, in which said signal generated by said means for comparing the phase of the A.C. signal with that of said signal generated by said controlled oscillator is electrically connected to said output terminal of the circuit through a band pass filter.

* * * * *